United States Patent
Humer et al.

(10) Patent No.: US 9,731,637 B2
(45) Date of Patent: Aug. 15, 2017

(54) SEAT ASSEMBLY HAVING A HEADREST AND METHOD OF ASSEMBLY

(71) Applicant: Lear Corporation, Southfield, MI (US)

(72) Inventors: Mladen Humer, West Bloomfield, MI (US); Ted Smith, Waterford, MI (US)

(73) Assignee: Lear Corporation, Southfield, MI (US)

( * ) Notice: Subject to any disclaimer, the term of this patent is extended or adjusted under 35 U.S.C. 154(b) by 108 days.

(21) Appl. No.: 14/827,777

(22) Filed: Aug. 17, 2015

(65) Prior Publication Data

US 2017/0050544 A1 Feb. 23, 2017

(51) Int. Cl.
*B60N 2/48* (2006.01)

(52) U.S. Cl.
CPC .................. *B60N 2/4852* (2013.01)

(58) Field of Classification Search
CPC ...... B60N 2/48; B60N 2/1805; B60N 2/4808; B60N 2002/4888; B60N 2002/4894; B60N 2002/4897; B60N 2/4805
USPC ...................... 297/404, 408, 410, 391, 216.2
See application file for complete search history.

(56) References Cited

U.S. PATENT DOCUMENTS

| | | | |
|---|---|---|---|
| 4,844,544 A | 7/1989 | Ochiai | |
| 4,861,107 A | 8/1989 | Vidwans et al. | |
| 4,991,907 A | 2/1991 | Tanaka | |
| 5,660,441 A | 8/1997 | Nagayasu et al. | |
| 5,906,414 A * | 5/1999 | Rus | B60N 2/4855 297/220 |
| 6,079,776 A | 6/2000 | Breitner et al. | |
| 6,129,421 A | 10/2000 | Gilson et al. | |
| 6,722,740 B2 | 4/2004 | Imayou et al. | |
| 6,824,212 B2 | 11/2004 | Malsch et al. | |
| 6,899,395 B2 | 5/2005 | Yetukuri et al. | |
| 7,946,653 B2 | 5/2011 | Robert et al. | |
| 8,322,790 B2 | 12/2012 | Tscherbner | |
| 8,690,253 B2 | 4/2014 | Tscherbner | |
| 8,814,271 B2 * | 8/2014 | Ishimoto | B60N 2/4838 297/220 |
| 8,851,562 B2 * | 10/2014 | Rezbarik | B60N 2/4808 297/378.12 |
| 9,511,696 B2 * | 12/2016 | Wang | B60N 2/4838 |
| 2005/0168038 A1 * | 8/2005 | Kubo | B60N 2/3013 297/410 |
| 2007/0057559 A1 * | 3/2007 | Miyahara | B60N 2/20 297/397 |
| 2008/0277989 A1 * | 11/2008 | Yamane | B60N 2/43 297/408 |
| 2010/0060066 A1 * | 3/2010 | Hojnacki | B60N 2/48 297/391 |
| 2010/0244511 A1 * | 9/2010 | Gomes | B60N 2/4221 297/216.12 |
| 2010/0283305 A1 * | 11/2010 | Yetukuri | B60N 2/4844 297/408 |

(Continued)

FOREIGN PATENT DOCUMENTS

JP 05329032 A * 12/1993

*Primary Examiner* — Robert Canfield
(74) *Attorney, Agent, or Firm* — Brooks Kushman P.C.

(57) ABSTRACT

A seat assembly having a headrest and a method of assembly. The headrest may be pivotally disposed on a support post and may have a support plate. The support plate may have first and second walls that have first and second holes, respectively, that may be disposed along the axis and that may receive the support post.

20 Claims, 6 Drawing Sheets

(56) References Cited

U.S. PATENT DOCUMENTS

| | | | | |
|---|---|---|---|---|
| 2010/0283307 A1* | 11/2010 | Fujita | ............... | B60N 2/485 297/408 |
| 2013/0140866 A1* | 6/2013 | Yetukuri | ............ | B60N 2/4844 297/408 |
| 2016/0355112 A1* | 12/2016 | Yamane | ............ | B60N 2/4808 |

* cited by examiner

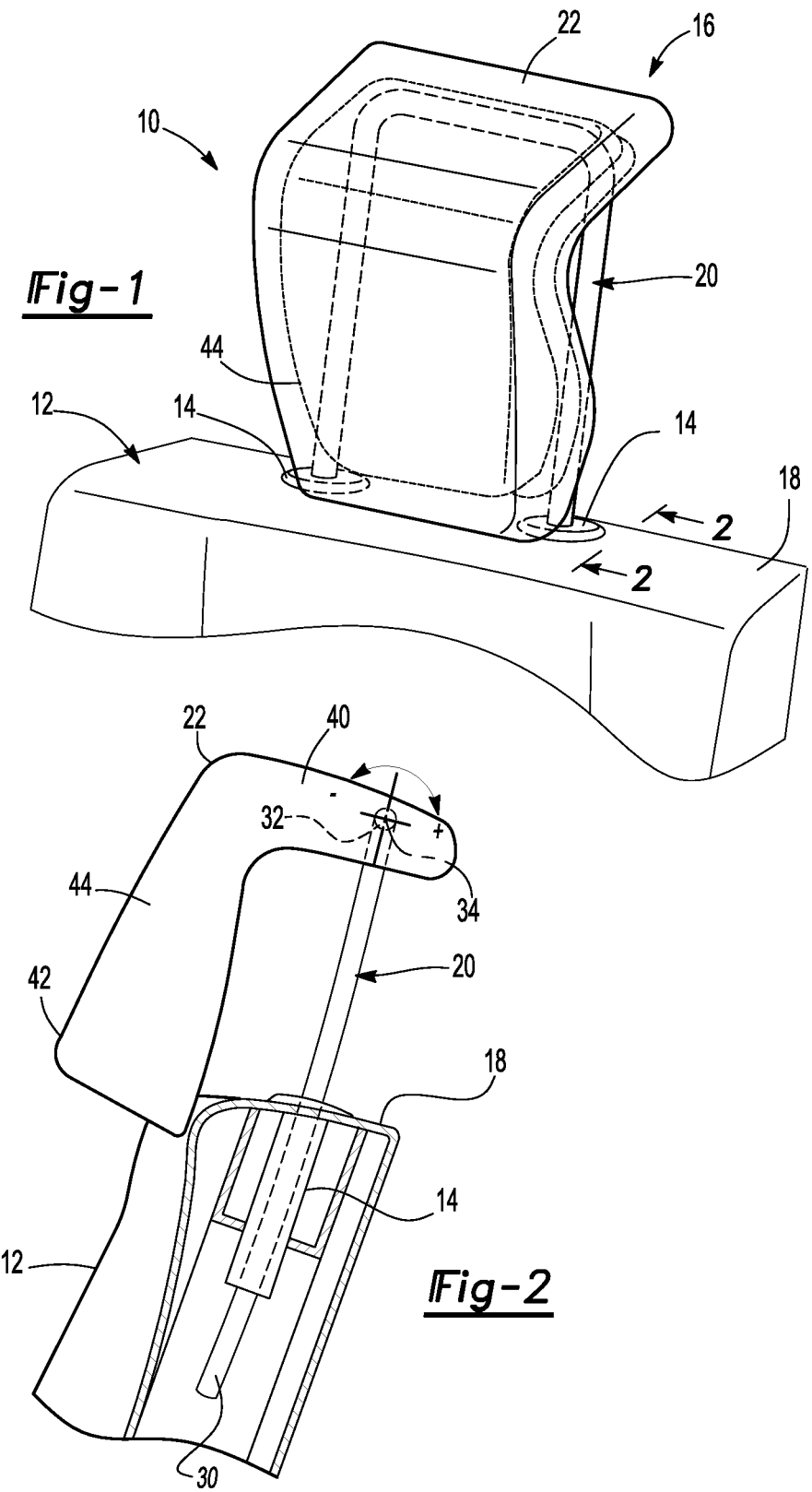

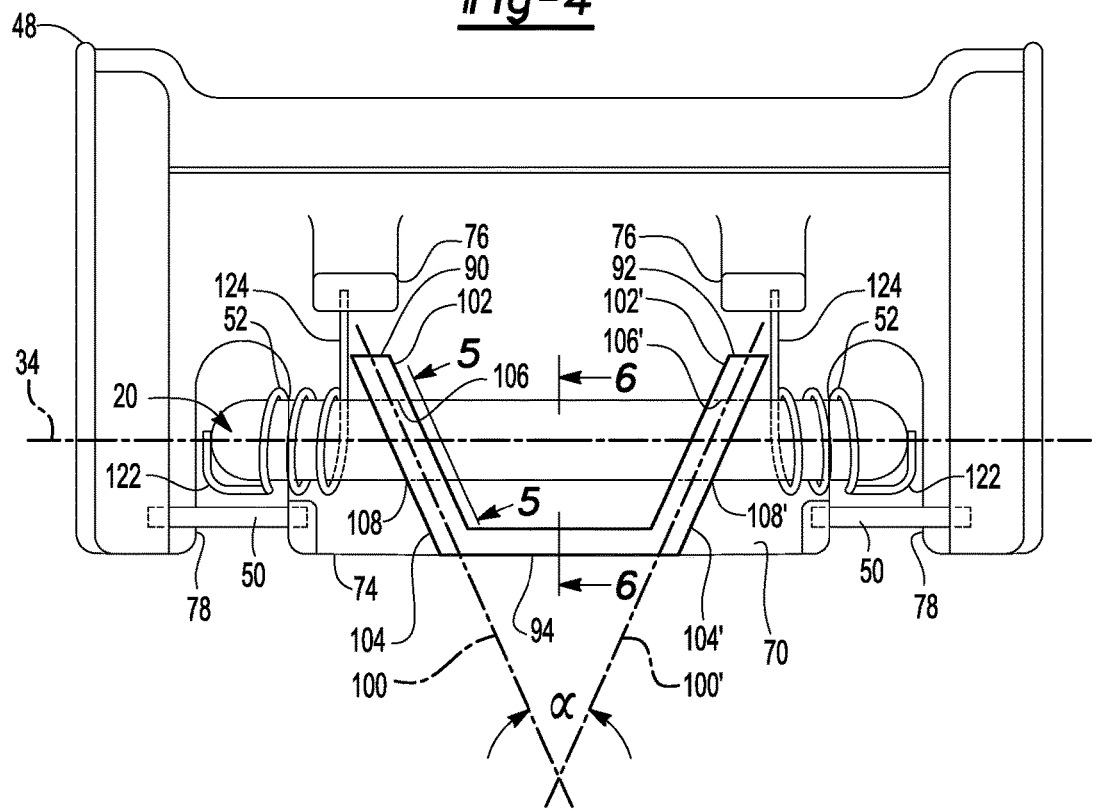
*Fig-4*
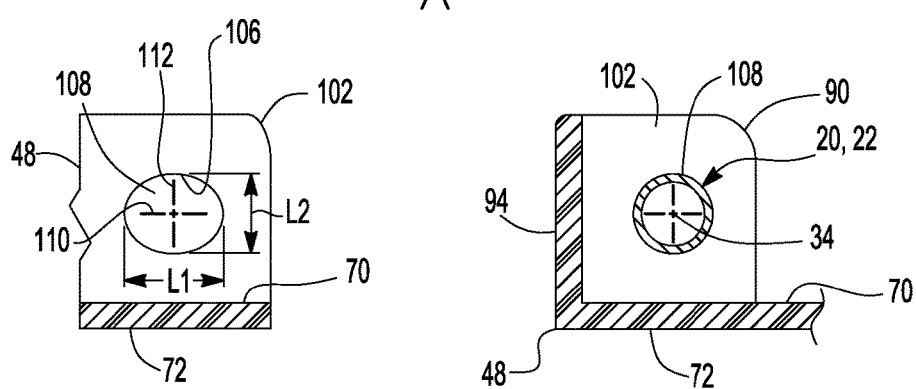
*Fig-5*  *Fig-6*

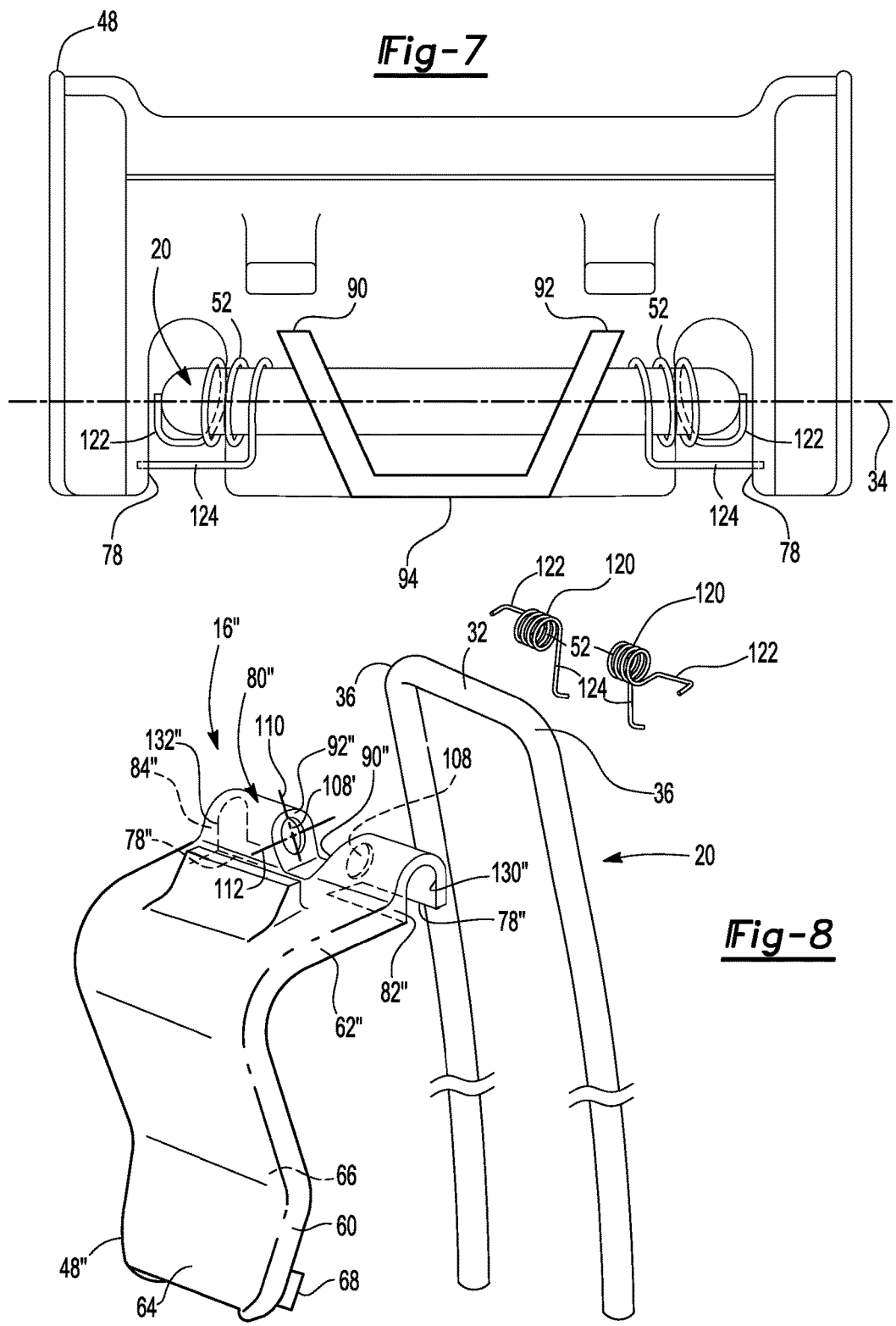

SEAT ASSEMBLY HAVING A HEADREST AND METHOD OF ASSEMBLY

TECHNICAL FIELD

This disclosure relates to a seat assembly having a headrest and a method of assembly.

BACKGROUND

A seat assembly having a multi-position head restraint assembly is disclosed in U.S. Pat. No. 8,322,790.

SUMMARY

In at least one embodiment, a seat assembly is provided. The seat assembly may include a seat back, a support post, and a headrest. The support post may extend from the seat back. The headrest may be pivotally disposed on the support post. The headrest may have a unitary support plate that may include an upper plate portion, a first wall, and a second wall. The upper plate portion may have an upper surface. The first wall may extend from the upper surface and may have a first hole that may be disposed along an axis. The second wall may extend from the upper surface and may have a second hole that may be disposed along the axis. The support post may extend through the first hole and the second hole and the headrest may pivot about the support post and the axis.

In at least one embodiment, a method of assembling a seat assembly is provided. The method may include providing a headrest that may have a support plate that may have a first wall and a second wall that both extend from an upper surface of the support plate. The first and second walls may have first and second holes, respectively, that may be disposed along an axis. A first leg of a support post may be inserted through the first hole and the second hole. The support post may be positioned such that a bend of the support post that may be located between the first leg and a connecting portion of the support post passes through the first hole and then through the second hole. The connecting portion may then be positioned along the axis.

In at least one embodiment, a head restraint assembly is provided. The head restraint assembly may include a support post and a headrest. The support post may be adapted for insertion into a seat back. The headrest may be pivotally disposed on the support post and may have a unitary support plate. The unitary support plate that may include an upper plate portion, a first wall, and a second wall. The upper plate portion may have an upper surface. The first wall may extend from the upper surface and may have a first hole that may be disposed along an axis. The second wall may extend from the upper surface and may have a second hole that may be disposed along the axis. The support post may extend through the first hole and the second hole and may pivot about the support post and the axis.

BRIEF DESCRIPTION OF THE DRAWINGS

FIG. 1 is a perspective view of a seat assembly having a head restraint assembly.

FIG. 2 is a section view of the seat assembly along section line 2-2.

FIG. 4 is a top view of a portion of the head restraint assembly.

FIG. 5 is a section view of a portion of the head restraint assembly along section line 5-5 with a support post omitted for clarity.

FIG. 6 is a section view of a portion of the head restraint assembly along section line 6-6.

FIG. 7 is a top view of a second embodiment of the head restraint assembly.

FIG. 8 is an exploded view of a third embodiment of a head restraint assembly.

DETAILED DESCRIPTION

Figure 3:
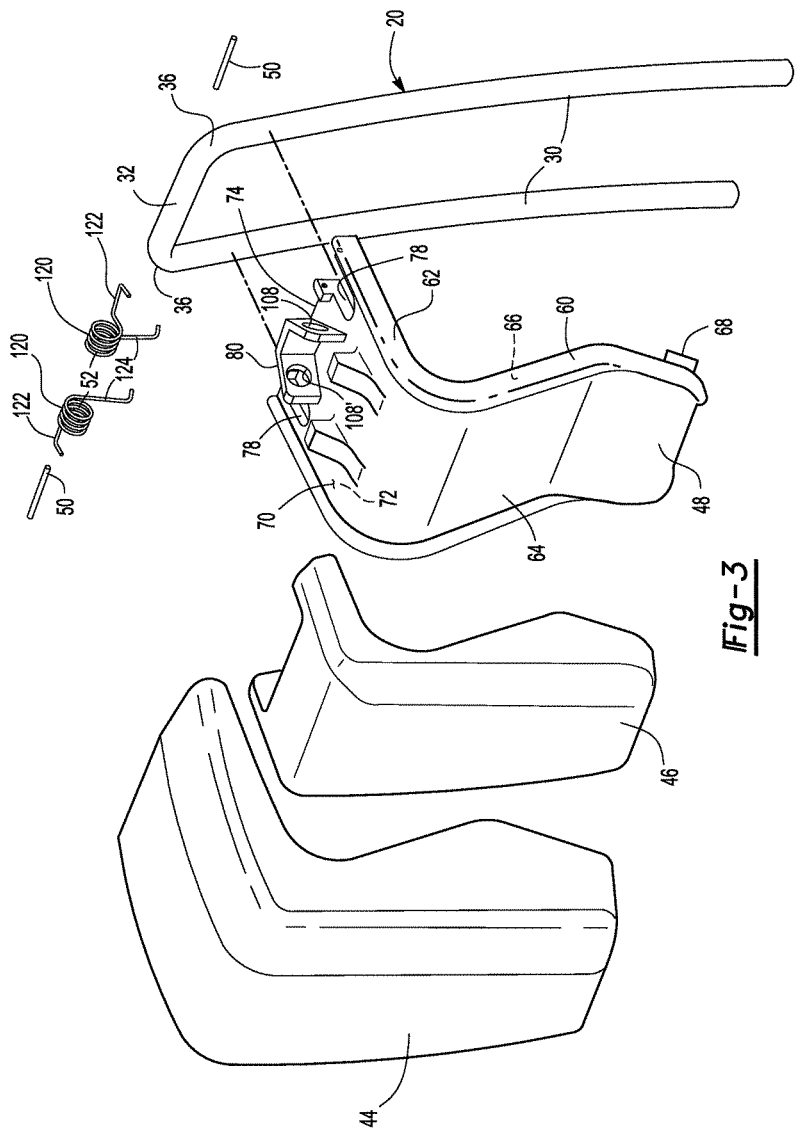
FIG. 3 is a partially exploded view of the head restraint assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1 and 2, a portion of an exemplary seat assembly 10 is shown. The seat assembly 10 may be configured for use in a vehicle, such as a motor vehicle like a car or truck.

The seat assembly 10 may include a seat bottom and a seat back 12. The seat bottom may be configured to be mounted on a support surface, such as a floor pan of the vehicle. The seat back 12 may be disposed proximate the seat bottom and may be configured to support the back of a seat occupant. The seat back 12 or a portion thereof may be configured to pivot or rotate with respect to the seat bottom. As is best shown in FIG. 2, the seat back 12 may include or receive one or more guide sleeves 14 that may facilitate mounting and movement of a head restraint assembly 16. For example, a guide sleeve 14 may extend through or may be disposed under a top surface 18 of the seat back 12 and may be fixedly disposed on a frame or support structure of the seat back 12.

Referring to FIGS. 1-4, a first embodiment of the head restraint assembly 16 is shown. The head restraint assembly 16 may include a support post 20 and a headrest 22.

The support post 20 may extend from the seat back 12 to the headrest 22. For example, the support post 20 may be received in at least one guide sleeve 14 and may also be partially received in the headrest 22. In at least one embodiment, the support post 20 may have a unitary, one-piece construction. For example, the support post 20 may have a generally U-shaped configuration that may include a pair of legs 30 and a connecting portion 32.

The legs 30 may be spaced apart from each other and may extend in a generally vertical direction from the seat back 12. The legs 30 may have substantially similar configurations. For example, the legs 30 may be generally linear and may extend along substantially parallel axes. Each leg 30 may have a tubular configuration or a generally circular cross section in one or more embodiments. In addition, each leg 30 may be received in a corresponding guide sleeve 14 when the head restraint assembly 16 is installed on the seat back 12. A guide sleeve 14 may be configured to selectively permit or inhibit movement of the support post 20 relative to the seat back 12. For instance, a leg 30 may move through a hole in a corresponding guide sleeve 14 to position the headrest 22 closer to or further away from the top surface 18 of the seat back 12.

The connecting portion 32 may extend between and may interconnect the legs 30. For example, the connecting portion 32 may extend in a generally horizontal direction from one leg 30 to another leg 30. The connecting portion 32 may be disposed along an axis 34 and may be disposed substantially perpendicular to the legs 30 in one or more embodiments. The support post 20 may have a pair of bends 36 that may be disposed proximate opposite ends of the connecting portion 32. Each bend 36 may extend along a curve or arc to a corresponding leg 30. The connecting portion 32 and the bends 36 may be received inside the headrest 22.

Referring to FIGS. 2 and 3, the headrest 22 may be configured to support the head of an occupant of the seat assembly 10. The headrest 22 may be moveably or pivotally disposed on the support post 20 as will be described in more detail below. In at least one embodiment, the headrest 22 may include an upper headrest portion 40, a lower headrest portion 42, a trim cover 44, a cushion 46, a support plate 48, a pivot stop 50, and one or more biasing members 52.

Referring to FIG. 2, the upper headrest portion 40 may be disposed along the top of the headrest 22. The upper headrest portion 40 may generally extend from the support post 20 toward the front of the headrest 22.

The lower headrest portion 42 may be disposed along the front of the headrest 22. The lower headrest portion 42 may extend from an end of the upper headrest portion 40 toward the seat back 12. For example, the lower headrest portion 42 may extend in a general vertical direction and may be disposed generally perpendicular to the upper headrest portion 40 in one or more embodiments. The lower headrest portion 42 may have a free end that may be detached from the seat back 12 and the support post 20.

Referring to FIGS. 2 and 3, the trim cover 44 may provide at least a portion of a visible exterior surface of the headrest 22. The trim cover 44 may be made of any suitable material or materials, such as a fabric, vinyl, leather, or the like. The trim cover 44 may cover the cushion 46 and at least a portion of the support plate 48. The trim cover 44 may be mounted to the headrest 22 in any suitable manner. For instance, the trim cover 44 may be attached to or adhered to the cushion 46. Alternatively or in addition, the trim cover 44 may be mounted to the support plate 48 in any suitable manner. For instance, the trim cover 44 may be attached to the support plate 48 with one or more trim cover mounting features such as a clip, enlarged bead, or drawstring that may secure the trim cover 44 to the support plate 48.

Referring to FIG. 3, the cushion 46 may be disposed between the trim cover 44 and the support plate 48. The cushion 46 may be made of any suitable material, such as foam. The cushion 46 may be provided as a separate component that is installed on the support plate 48 or may be provided by a foam-in-place manufacturing process in which foam may be injected inside the trim cover 44 and may expand and adhere or attach to the trim cover 44 and the support plate 48.

The support plate 48 may act as a structural member that receives and distributes load forces imparted to the headrest 22. The support plate 48 may have a unitary or one-piece construction. The support plate 48 may be made of any suitable material or materials, such as a polymeric material that may be injection molded. In at least one embodiment, the support plate 48 may include a lower plate portion 60 and an upper plate portion 62.

Referring to FIG. 3, the lower plate portion 60 may extend in a generally vertical direction. The lower plate portion 60 may include a first side or first surface 64 that may be disposed proximate and may engage the cushion 46 and a second side or second surface 66 that may be disposed opposite the first surface 64. One or more bumpers 68 may be provided on the second surface 66. The bumpers 68 may be disposed proximate the bottom end or free end of the lower plate portion 60 and may extend toward and may engage the legs 30 of the support post 20 when the support post 20 is extended away the seat back 12 to the position shown in FIG. 1. Optionally, a trim channel may be provided on the second surface 66 to facilitate mounting of the trim cover 44. The trim channel may be configured as a groove and may extend onto the upper plate portion 62.

The upper plate portion 62 may extend from an end of the lower plate portion 60. The upper plate portion 62 may extend rearward from the lower plate portion 60 or generally away from the head of a seat occupant and toward the support post 20. The upper plate portion 62 may be integrally formed with the lower plate portion 60. In at least one embodiment, the upper plate portion 62 may include an upper side or upper surface 70, a lower side or lower surface 72, a rear surface 74, one or more biasing member mounting features 76, one or more slots 78, and a mounting portion 80.

The upper surface 70 may face away from the top surface 18 of the seat back 12. The upper surface may be disposed proximate the cushion 46 and may engage the cushion 46.

The lower surface 72 may be disposed opposite the upper surface 70. The lower surface 72 may face toward the top surface 18 of the seat back 12.

The rear surface 74 may be disposed at an end of the upper plate portion 62 that may be disposed opposite the lower plate portion 60. The rear surface 74 may extend from the upper surface 70 to the lower surface 72.

Referring to FIG. 4, one or more biasing member mounting features 76 may be provided with the upper plate portion 62. A biasing member mounting feature 76 may facilitate coupling of a biasing member 52 to the support plate 48. The biasing member mounting feature 76 may have any suitable configuration. For example, a biasing member mounting feature 76 may be configured as a protrusion that may extend from the upper surface 70 and may be configured to receive or engage a biasing member 52. Alternatively, a biasing member mounting feature 76 may be configured as a hole that may receive or engage the biasing member 52. In FIG. 4, two biasing member mounting features 76 are shown that are disposed between the connecting portion 32 of the support post 20 and the lower plate portion 60; however, it is contemplated that a greater or lesser number of biasing member mounting features 76 may be provided.

One or more slots 78 may extend from the upper surface 70 to the lower surface 72. In the embodiment shown in FIG. 4, two slots 78 are provided that are spaced apart from each other and that receive different legs 30 of the support post 20. Each slot 78 may extend from the rear surface 74 toward the lower plate portion 60. In addition, each slot 78 may be open or have a slot opening at the rear surface 74. The slots 78 may be disposed on an opposite sides of the mounting portion 80 such that the mounting portion 80 may be disposed between the slots 78. The slots 78 may be elongated in a direction that extends toward the lower plate portion 60. As such, the slots 78 may be larger than a diameter of a leg 30 of the support post 20 to provide space for the support plate 48 to pivot with respect to the support post 20.

The mounting portion 80 may facilitate mounting of the support post 20 to the support plate 48. The mounting portion 80 may extend from the upper surface 70 of the upper plate portion 62 and may extend away from the lower surface 72. In at least one embodiment, the mounting portion 80 may include a first wall 90, a second wall 92, and a connecting wall 94.

The first wall 90 may extend from the upper surface 70 of the support plate 48 in a direction that may extend away from the lower surface 72 and the seat back 12. In the embodiment shown in FIG. 4, the first wall 90 extends at an angle from the connecting wall 94 toward the front of the headrest 22 or in a direction that extends away from the rear surface 74. The first wall 90 may be disposed in a first plane 100 and may have a first wall surface 102, a second wall surface 104, a first hole surface 106, and a first hole 108.

The first wall surface 102 may face toward the second wall 92 and may extend from the connecting wall 94. In at least one embodiment, the first wall surface 102 may be substantially planar and may be disposed in or may be disposed substantially parallel to the first plane 100.

The second wall surface 104 may be disposed opposite the first wall surface 102. As such, the second wall surface 104 may face toward an adjacent slot 78 and an adjacent leg 30 of the support post 20. In at least one embodiment, the second wall surface 104 may be substantially planar and may be disposed substantially parallel to the first plane 100.

The first hole surface 106 may define the first hole 108. The first hole surface 106 may extend from the first wall surface 102 to the second wall surface 104. The first hole surface 106 may be disposed in a non-perpendicular relationship with the first wall surface 102 and the second wall surface 104. In addition, the first hole surface 106 may be centered about the axis 34 and may disposed at a substantially constant radial distance from the axis 34. As such, the first hole surface 106 may be disposed substantially perpendicular to the axis 34.

The first hole 108 may receive the support post 20. The first hole 108 may be completely defined in the first wall 90. The first hole 108 may have an elliptical configuration. More specifically, the first hole 108 may be an elliptical hole or may be an ellipse in the first plane 100 or when viewed substantially perpendicular to the first plane 100 or the first wall 102 as is best shown in FIG. 5. For instance, the first hole 108 may be a 35° ellipse. The first hole 108 may be disposed along a major axis 110 and a minor axis 112. The major axis 110 and the minor axis 112 may be disposed in the first plane 100 or substantially parallel to the first plane 100. The major axis 110 may be disposed substantially perpendicular to the minor axis 112. The length L1 of the first hole 108 along the major axis 110 may be greater than the length L2 of the first hole 108 along the minor axis 112. In FIG. 5, the major axis 110 may extend in a generally horizontal direction while the minor axis 112 may extend in a generally vertical direction and may be disposed substantially perpendicular to the upper surface 70. The elliptical configuration may allow the support post 20 to be moved or rotated such that the bend 36 may pass through the first hole 108 to facilitate assembly as will be discussed in more detail below.

Referring to FIG. 6, the first hole 108 may have a substantially circular configuration when viewed along the axis 34. The first hole 108 may be substantially circular in a cross section plane that may be disposed substantially perpendicular to the axis 34.

Referring again to FIG. 4, the second wall 92 may be spaced apart from the first wall 90. As such, the second wall 92 may not engage the first wall 90 in one or more embodiments. Like the first wall 90, the second wall 92 may extend from the upper surface 70 of the support plate 48 in a direction that may extend away from the lower surface 72 and the seat back 12. In the embodiment shown in FIG. 4, the second wall 92 extends at an angle from the connecting wall 94 toward the front of the headrest 22 or in a direction that extends away from the rear surface 74.

The second wall 92 may have similar features as the first wall 90 but may have a different orientation with respect to the connecting wall 94 than the first wall 90. For example, the second wall 92 may be configured as a mirror image of the first wall 90. As such, the second wall 92 may be disposed at an acute angle with respect to the first wall 90. For instance, the first wall 90 and the second wall 92 may be disposed at an angle $\alpha$ of approximately 65 to 75° with respect to each other. In FIG. 4, the first wall 90 and the second wall 92 are shown disposed at an angle of approximately 70°.

Similar reference numbers are used to designate features of the first wall 90 and the second wall 92. The second wall 92 may be disposed in a second plane 100' and may have a first wall surface 102', a second wall surface 104', a second hole surface 106', and a second hole 108'.

The first wall surface 102' may face toward the first wall 90 and may extend from the connecting wall 94. In at least one embodiment, the first wall surface 102' may be substantially planar and may be disposed in or may be disposed substantially parallel to the second plane 100'. The first plane 100 and the second plane 100' may be disposed at an acute angle with respect to each other.

The second wall surface 104' may be disposed opposite the first wall surface 102'. As such, the second wall surface 104' may face toward an adjacent slot 78 and an adjacent leg 30 of the support post 20. In at least one embodiment, the second wall surface 104' may be substantially planar and may be disposed substantially parallel to the second plane 100'.

The second hole surface 106' may define the second hole 108'. The second hole surface 106' may extend from the first wall surface 102' to the second wall surface 104'. The second hole surface 106' may be disposed in a non-perpendicular relationship with the first wall surface 102' and the second wall surface 104'. In addition, the second hole surface 106' may be centered about the axis 34 and may disposed at a substantially constant radial distance from the axis 34. As such, the second hole surface 106' may be disposed substantially perpendicular to the axis 34.

The second hole 108' may receive the support post 20. The second hole 108' may be completely defined in the second wall 92. The second hole 108' may have an elliptical configuration as previously described with respect to the first hole 108. As such, the second hole 108' may be an elliptical hole or may be an ellipse in the second plane 100' and may be disposed along a major axis 110 and a minor axis 112 that may be disposed in or substantially parallel to the second plane 100'. The length of the second hole 108' along the major axis 110 may be greater than the length of the second hole 108' along the minor axis 112 as previously described. The major axis 110 may extend in a generally horizontal direction while the minor axis 112 may extend in a generally vertical direction and may be disposed substantially perpendicular to the upper surface 70 as previously described.

The connecting wall 94 may extend from the upper surface 70 of the support plate 48 in a direction that extends away from the lower surface 72 and the seat back 12. The connecting wall 94 may also extend from the first wall 90 to the second wall 92. For example, the first wall 90 and the second wall 92 may be disposed proximate and may extend from opposite ends of the connecting wall 94. Moreover, the first wall 90 and the second wall 92 may become further apart in a direction that extends away from the connecting wall 94 and from the axis 34, such as a direction that is disposed generally perpendicular to the connecting wall 94 and the axis 34. The connecting wall 94 may be spaced apart from and may not engage the support post 20. In addition, the connecting wall 94 may extend from or may at least partially define the rear surface 74 of the support plate 48.

The mounting portion 80 and its first wall 90, second wall 92, and connecting wall 94, if provided, may be rotated about the axis 34 from the position shown in FIG. 4 while maintaining the same relative angular positioning between the first wall 90 and the second wall 92. For instance, the mounting portion 80 in FIG. 4 may be rotated 90, 180, or 270 degrees about the axis 34 from the position shown or to any suitable rotational position therebetween.

The pivot stop 50 may limit rotation of the headrest 22 with respect to the support post 20. One or more pivot stops 50 may be provided with the headrest 22. In FIG. 4, two pivot stops 50 are shown that are each fixedly positioned with respect to the support plate 48 and located adjacent to a corresponding slot 78. For example, a pivot stop 50 may extend across a slot 78 and may be positioned between a leg 30 of the support post 20 and the rear surface 74 where the slot opening may be located. As such, the pivot stop 50 may limit rotation of the headrest 22 in a clockwise direction about the axis 34 from the perspective shown in FIG. 2, or in a direction that rotates the lower headrest portion 42 away from the seat back 12 or legs 30 of the support post 20.

Referring to FIGS. 4 and 6, one or more biasing members 52 may be provided with the headrest 22. In the embodiment shown in FIG. 4, two biasing members 52 are shown; however, it is contemplated that a greater or lesser number of biasing members 52 may be provided. In addition, it is contemplated that one or more biasing members 52 may be provided in a different position from that shown in FIG. 4. For example, one or more biasing members may be disposed between the first wall 90 and the second wall 92 of the mounting portion 80 rather than near a bend 36. The biasing member 52 may exert a biasing force that may bias or urge the headrest 22 to rotate about the axis 34. For instance, the biasing member 52 may bias or urge the headrest 22 to rotate in a counterclockwise direction about the axis 34 from the perspective shown in FIG. 2 such that the lower plate portion 60 may rotate toward the support post 20. The biasing member 52 may have any suitable configuration. For instance, the biasing member 52 may be configured as an elastic member or spring, such as a coil torsion spring. In the embodiment shown, the biasing member 52 has a coil portion 120, a first arm 122, and a second arm 124.

The coil portion 120 may include one or more coils that may extend around the support post 20. In at least one embodiment, the coil portion 120 may be disposed proximate the connecting portion 32 of the support post 20.

The first arm 122 may extend from an end of the coil portion 120. The first arm 122 may engage a surface of the support post 20, such as an exterior surface of a leg 30.

The second arm 124 may be disposed opposite the first arm 122. The second arm 124 may extend from the coil portion 120 and may be disposed at an end of the biasing member 52. The second arm 124 may be disposed on the support plate 48 and may engage the support plate 48. For instance, the second arm 124 may engage or may be received in a biasing member mounting feature 76 of the upper plate portion 62 of the support plate 48 as is shown in FIG. 4. In one or more other embodiments, such as that shown in FIG. 7, the second arm 124 may extend across a corresponding slot 78 and may be fixedly positioned on the support plate 48. In such a configuration, the second arm 124 may act as a pivot stop or may replace the pivot stop 50. As such, the second arm 124 may limit or stop rotation of the support plate 48 about the axis 34 when the support post 20 engages the second arm 124.

Figure 9:
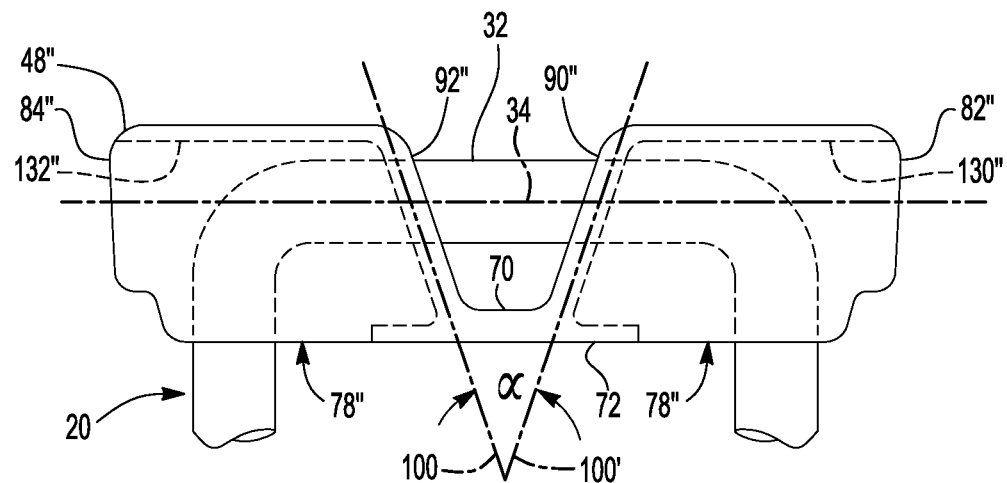
FIG. 9 is a rear view of a portion of the head restraint assembly of FIG. 8.
Figure 10:
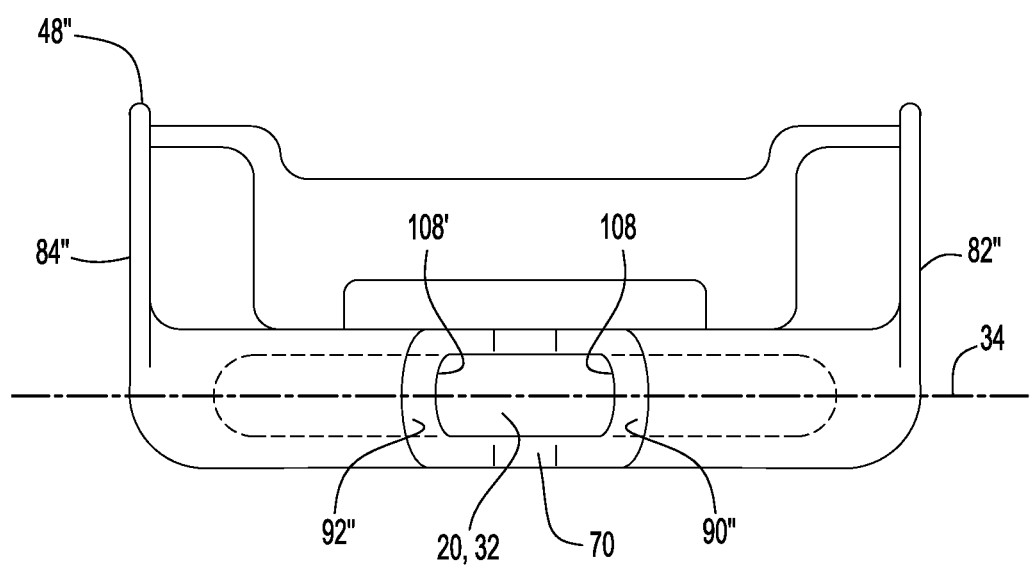
FIG. 10 is a top view of a portion of the head restraint assembly of FIG. 8.

Referring to FIGS. 8-10, another embodiment of a head restraint assembly 16" is shown. The head restraint assembly 16" may be substantially similar to the head restraint assembly 16 previously discussed but may have a support plate 48" with a different configuration. For example, the support plate 48" may have a lower plate portion 60 and an upper plate portion 62". The upper plate portion 62" may have an upper surface 70, a lower surface 72, a rear surface 74, one or more biasing member mounting features 76, one or more slots 78", a mounting portion 80", a first side wall 82", and a second side wall 84".

The mounting portion 80" may include a first wall 90" and a second wall 92" that may be substantially similar to the first wall 90 and the second wall 92 as previously described, but that may have a different orientation than the first wall 90 and the second wall 92. The first wall 90" may extend from the upper surface 70 of the support plate 48" in a direction that may extend away from the lower surface 72 and the seat back 12. The first wall 90" may extend at an angle from the upper surface 70 and away from the lower surface 72. The second wall 92" may be spaced apart from the first wall 90" and may also extend from the upper surface 70 of the support plate 48" in a direction that may extend away from the lower surface 72 and the seat back 12. The first wall 90" and the second wall 92" may be disposed at an angle of approximately 65 to 75° with respect to each other, but may be oriented such that first wall 90" and the second wall 92" may become further apart in a direction that extends away from the upper surface 70 and toward the axis 34.

The first side wall 82" may extend along a lateral side of the upper plate portion 62". For example, the first side wall 82" may be disposed between the rear surface 74 and the lower plate portion 60. The first side wall 82" may have a first side wall slot 130". The first side wall slot 130" may extend in a generally vertical direction and may extend from a first slot 78" that may extend through the support plate 48" and may be disposed substantially parallel the axis 34 rather than extend from the rear surface 74. The first side wall slot 130" may be disposed along the axis 34 to permit the support post 20 to be inserted through the first side wall slot 130" during assembly as will be discussed in more detail below.

The second side wall 84" may be disposed opposite the first side wall 82". The second side wall 84" may extend along a lateral side of the upper plate portion 62" that may be disposed opposite the first side wall 82". The second side wall 84" may be disposed between the rear surface 74 and the lower plate portion 60. The second side wall 84" may have a second side wall slot 132". The second side wall slot 132" may extend a generally vertical direction and may extend from a second slot 78" that may be disposed opposite the first slot 78". The second side wall slot 132" may be disposed along the axis 34 and may permit the support post to be inserted through the second side wall slot 132" during assembly.

Figure 11A:
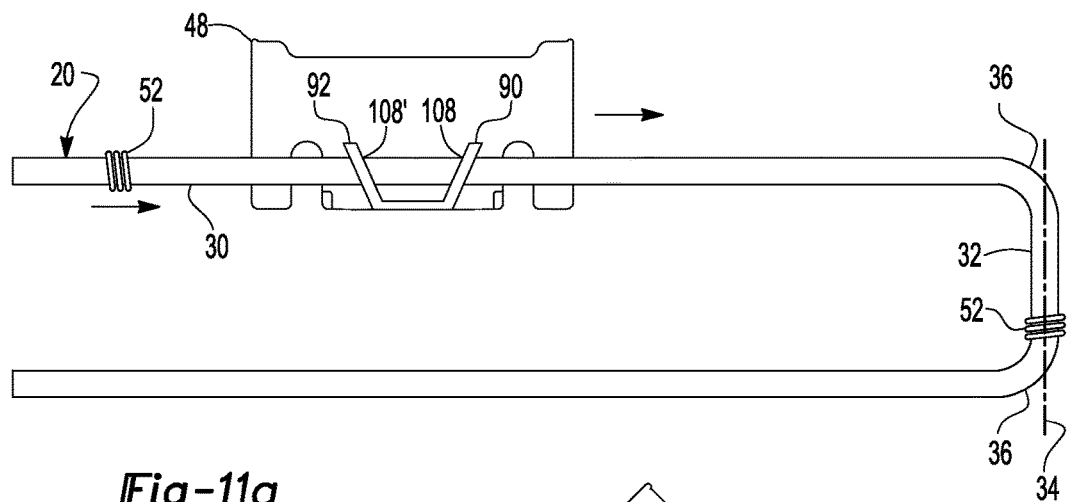
FIGS. 11a-11c illustrate an exemplary method of assembly.
Figure 11B:
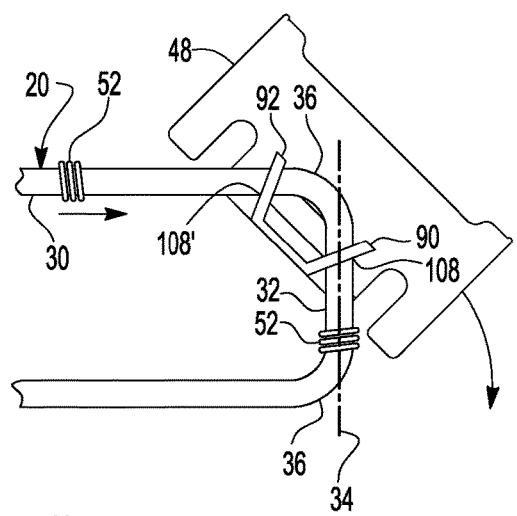
Figure 11C:
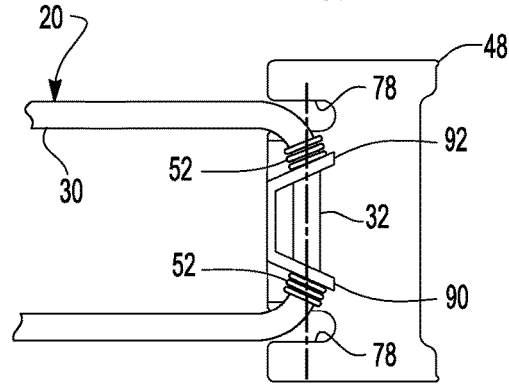

Referring to FIGS. 11a-11c, a method of assembly is illustrated. The method of assembly is described primarily with respect to the head restraint assembly 16 and support plate 48, but it is to be understood that the same or similar method steps may be employed with the head restraint assembly 16" and support plate 48".

In FIG. 11a, the support post 20 and the headrest 22 or a portion of the headrest 22 such as the support plate 48 may be provided. The support post 20 may be positioned such that a leg 30 may be aligned with the axis 34. The leg 30 may be inserted through the first hole 108 and then through the second hole 108' after being inserted through the first hole 108. (In the embodiment shown in FIGS. 8-10, the leg 30 may also be inserted through the first side wall slot 130" and the second side wall slot 132".) Depending on the configuration and number of biasing members 52 employed, the support post 20 may receive or may be inserted through one or more biasing members 52 before the leg 30 is installed through the first hole 108, the second hole 108', or the first hole 108 and the second hole 108'.

The support post 20 may move relative to the support plate 48 or vice versa from the position shown in FIG. 11a to the position shown in FIG. 11b. In FIG. 11b, the support plate 48 is positioned at a bend 36 in the support post 20. The support plate 48 may slide or move with respect to the support post 20 around the bend 36 so that the support plate 48 may be positioned on the connecting portion 32 of the support post 20. The support plate 48 may slide, move, or rotate around the bend 36 due to the configuration of the first hole 108 and the second hole 108' and the positioning of the first wall 90 with respect to the second wall 92. More specifically, the elliptical configuration of the first hole 108 and the second hole 108' and orientation and positioning of the first wall 90 and second wall 92 may allow the support post 20 to be simultaneously received in the first hole 108 and the second hole 108' proximate the bend 36, such as when the first hole 108 receives the connecting portion 32 and the second hole 108' receives the leg 30.

In FIG. 11c the support plate 48 is shown positioned on the connecting portion 32. The support plate 48 may be positioned on the connecting portion by passing the bend 36 through the first hole 108 and the second hole 108'. The connecting portion 32 may be disposed along the axis 34 in the position shown in FIG. 11c.

The support post 20 may subsequently be rotated about the axis 34 such that the legs 30 are each received in a corresponding slot 78 of the support plate 48. For example, the support post 20 may be rotated approximately 90° about the axis 34 from the position shown in FIG. 11c to the position shown in FIG. 4. (This step may be omitted in the embodiment shown in FIGS. 8-10). One or more arms of a biasing member 52 may be positioned on the support plate 48 so that the biasing member 52 may exert a desired biasing force. One or more pivot stops 50, if provided, may then be installed on the support plate 48 after the support post 20 is rotated to the position shown in FIG. 4. Alternately, an arm of at least one biasing member 52 may be positioned on the support plate 48 and may act as a pivot stop as previously discussed and as is shown in FIG. 7. It is contemplated that a pivot stop 50 may be provided or that an arm of the biasing member 52 may act as a pivot stop in the embodiment shown in FIGS. 8-10. The cushion 46 and trim cover 44 may be installed after assembling the support plate 48 to the support post 20 if such components were not previously installed.

The seat assembly and head restraint assemblies described above may allow a support post to be directly assembled to a structural component of a headrest without an intervening coupling component, such as a clip like a friction clip, hinge clip, spring clip, or swivel bearing clip, or similar components that may be referred to as a leaf spring, a swivel bearing, a friction member, a friction bushing, a clamp, or a clamp member, that may extend at least partially around the support post and that may be used to pivotally attach the headrest to the support post. Such intervening components may be separate components from the support post and support plate. As such, the intervening coupling component may be eliminated along with any corresponding fasteners or mounting features for mounting the intervening coupling component to the headrest, thereby allowing the support post to be directly coupled to the support structure of the headrest.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat back;
   a support post that extends from the seat back;
   a headrest that is pivotally disposed on the support post and has a unitary support plate that includes:
   an upper plate portion having an upper surface;
   a first wall that extends from the upper surface and has a first hole disposed along an axis; and
   a second wall that extends from the upper surface and has a second hole disposed along the axis, wherein the first wall is spaced apart from the second wall and is disposed at an acute angle with respect to the second wall;
   wherein the support post extends through the first hole and the second hole and the headrest pivots about the support post and the axis.

2. The seat assembly of claim 1 wherein the first hole and the second hole are elliptical.

3. The seat assembly of claim 1 further comprising a connecting wall that extends from the upper surface and away from the seat back, wherein the first wall and the second wall extend from opposite ends of the connecting wall.

4. The seat assembly of claim 3 wherein the first wall and the second wall extend from the connecting wall such that the first wall and the second wall become further apart in a direction that extends away from the connecting wall and through the axis.

5. The seat assembly of claim 3 wherein the connecting wall at least partially defines a rear surface of the support plate.

6. The seat assembly of claim 5 wherein the support plate further comprises a first slot and a second slot that both extend through the support plate and that are both open at the rear surface, wherein the support post extends through the first slot and the second slot.

7. The seat assembly of claim 6 further comprising a biasing member that extends around the support post, wherein the biasing member has a first arm that is disposed proximate the support post and a second arm that is disposed opposite the first arm, wherein the second arm extends across the first slot and engages the support plate such that the second arm stops rotation of the support plate about the axis when the support post engages the second arm.

8. The seat assembly of claim 1 wherein the first wall and the second wall are spaced apart from each other and extend from the upper surface such that the first wall and the second wall become further apart in a direction that extends away from the upper surface and toward the axis.

9. The seat assembly of claim 8 wherein the first hole and the second hole are elliptical with respect to the axis.

10. The seat assembly of claim 8 wherein the support plate includes a first side wall and a second side wall disposed opposite the first side wall, wherein the first side wall has a first side wall slot and the second side wall has a second side wall slot that is disposed opposite the first side wall slot, wherein the axis extends through the first side wall slot and the second side wall slot.

11. The seat assembly of claim 10 wherein the upper plate portion has a first slot and a second slot that both extend through the upper plate portion such that the first slot extends to the first side wall slot and the second slot extends to the second side wall slot, wherein legs of the support post extend through the first slot and the second slot.

12. The seat assembly of claim 8 wherein the first wall is disposed in a first plane and the first hole is an ellipse in the first plane.

13. The seat assembly of claim 8 wherein the first wall has a first wall surface, a second wall surface disposed opposite the first wall surface, and a first hole surface, wherein the first hole surface extends from the first wall surface to the second wall surface and defines the first hole, wherein the first hole surface is disposed at a substantially constant radial distance from the axis and is disposed in a non-perpendicular relationship with the first wall surface and the second wall surface.

14. A head restraint assembly comprising:
a support post adapted for insertion into a seat back;
a headrest that is pivotally disposed on the support post and has a support plate that includes:
an upper plate portion having an upper surface;
a first wall that extends from the upper surface and has a first hole disposed along an axis; and
a second wall that extends from the upper surface and has a second hole disposed along the axis, wherein the first hole and the second hole are elliptical;
wherein the support post extends through the first hole and the second hole and the headrest pivots about the support post and the axis.

15. The head restraint assembly of claim 14 wherein the first wall is spaced apart from the second wall and is disposed at an acute angle with respect to the second wall.

16. A method of assembling a seat assembly comprising:
providing a headrest that has a support plate that has a first wall and a second wall that both extend from an upper surface of the support plate, wherein the first wall has a first hole disposed along an axis and the second wall has a second hole that is disposed along the axis;
inserting a first leg of a support post through the first hole and the second hole;
positioning the support post such that a bend of the support post that extends between the first leg and a connecting portion of the support post passes through the first hole and then the second hole; and
positioning the connecting portion along the axis.

17. The method of claim 16 wherein the support post is inserted through the second hole after being inserted through the first hole and the bend is arranged such that the first leg is disposed substantially perpendicular to the connecting portion.

18. The method of claim 16 further comprising installing a pivot stop on the support plate after positioning the connecting portion along the axis, wherein the support post engages the pivot stop to stop rotation of the support plate about the axis with respect to the support post.

19. The method of claim 16 further comprising inserting the support post through a biasing member before inserting the first leg through the second hole.

20. The method of claim 19 wherein the biasing member has a first arm and a second arm, wherein the first arm is disposed proximate the support post and the second arm stops rotation of the support plate about the axis when the support post engages the second arm.

* * * * *